United States Patent
Han et al.

(10) Patent No.: US 8,194,781 B2
(45) Date of Patent: Jun. 5, 2012

(54) METHOD AND APPARATUS FOR TRANSMITTING AND RECEIVING CONTROL CHANNEL MESSAGE IN A MIMO MOBILE COMMUNICATION SYSTEM

(75) Inventors: Jin-Kyu Han, Seoul (KR); Hwan-Joon Kwon, Suwon-si (KR); Dong-Hee Kim, Yongin-si (KR); Jae-Chon Yu, Suwon-si (KR); Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1182 days.

(21) Appl. No.: 11/966,507

(22) Filed: Dec. 28, 2007

(65) Prior Publication Data

US 2008/0212700 A1 Sep. 4, 2008

(30) Foreign Application Priority Data

Dec. 29, 2006 (KR) .................. 10-2006-0139056

(51) Int. Cl.
*H04L 27/00* (2006.01)
(52) U.S. Cl. ........ 375/295; 375/260; 375/262; 375/267; 375/340; 375/347
(58) Field of Classification Search .................. 375/260, 375/296, 297, 262, 267, 340, 347; 370/203, 370/204, 205, 208, 209, 210
See application file for complete search history.

(56) References Cited

U.S. PATENT DOCUMENTS

| | | | |
|---|---|---|---|
| 6,807,147 B1 | 10/2004 | Heinonen et al. | |
| 7,042,857 B2 | 5/2006 | Krishnan et al. | |
| 7,248,638 B1 * | 7/2007 | Banister | 375/267 |
| 7,720,470 B2 * | 5/2010 | Shi et al. | 455/425 |
| 2007/0011550 A1 * | 1/2007 | Agrawal et al. | 714/746 |
| 2008/0232504 A1 * | 9/2008 | Ma et al. | 375/267 |
| 2009/0098899 A1 * | 4/2009 | Gorokhov et al. | 455/522 |

FOREIGN PATENT DOCUMENTS

| | | |
|---|---|---|
| KR | 1020060039776 | 5/2006 |
| WO | WO 01/80579 | 10/2001 |

OTHER PUBLICATIONS

Alexei Gorokhov, "Forward Link Signaling Enhancements for LBC FDD", p. 2-11, Oct. 31, 2006.

* cited by examiner

*Primary Examiner* — Dhaval Patel
(74) *Attorney, Agent, or Firm* — The Farrell Law Firm, P.C.

(57) ABSTRACT

A method and apparatus for transmitting and receiving a control channel message in a Multiple Input Multiple Output (MIMO) mobile communication system are provided, in which a control channel message generator generates a pilot/MIMO field indicating at least one of a pilot format, a MIMO transmission rank being a number of transmission layers for transmitting encoded packet streams, and precoding information for MIMO data transmission, and outputs a control channel message including the pilot/MIMO field, and a transmission module converts the control channel message to a radio signal and transmits the radio signal to an MS. In the case of using common pilots for data demodulation and at least one of knock-down precoding and ready-made precoding for the MIMO transmission, the pilot/MIMO field includes information about the at least one precoding. In the case of dedicated pilots for data demodulation, the pilot/MIMO field indicates a format of the dedicated pilots.

24 Claims, 10 Drawing Sheets

METHOD AND APPARATUS FOR TRANSMITTING AND RECEIVING CONTROL CHANNEL MESSAGE IN A MIMO MOBILE COMMUNICATION SYSTEM

PRIORITY

This application claims priority under 35 U.S.C. §119(a) to a Korean Patent Application filed in the Korean Intellectual Property Office on Dec. 29, 2006 and assigned Serial No. 2006-139056, the entire disclosure of which is hereby incorporated by reference.

BACKGROUND OF THE INVENTION

1. Field of the Invention

The present invention generally relates to a mobile communication system. More particularly, the present invention relates to a method for transmitting and receiving a Forward Shared Control CHannel (F-SCCH) message to support a variety of antenna technologies for data transmission in a Multiple Input Multiple Output (MIMO) mobile communication system.

2. Description of the Related Art

Mobile communication systems are evolving to high-speed, high-quality wireless packet data communication systems that additionally provide data service and multimedia service beyond the early-stage voice service. Many mobile communication standards such as $3^{rd}$ Generation Partnership Project (3GPP) High Speed Downlink Packet Access (HSDPA), 3GPP High Speed Uplink Packet Access (HSUPA), $3^{rd}$ Generation Partnership Project 2 (3GPP2) High Rate Packet Data (HRPD), and Institute of Electrical and Electronics Engineers (IEEE) 802.16e have recently been developed to support high-speed, high-quality wireless packet data service.

$3^{rd}$ Generation (3G) wireless packet data communication systems use Adaptive Modulation and Coding (AMC) and channel sensitive scheduling in order to increase transmission efficiency. With AMC, a transmitter can control the amount of transmission data according to channel status. For a receiver in a poor channel status environment, the transmitter transmits less data to the receiver to thereby maintain a reception error probability at an acceptable level. For a receiver in a good channel status environment, the transmitter transmits more data to the receiver so as to achieve a desired reception error probability and enable efficient transmission of a large volume of data. Channel sensitive scheduling is a scheme in which the transmitter selects a user in a good channel status environment from among a plurality of users and provides services to the user. Compared to allocating a channel to one user and providing services to the user, the channel sensitive scheduling increases system capacity. This system capacity increase is called a multi-user diversity gain. That is, the AMC and channel sensitive scheduling schemes apply an appropriate Modulation and Coding Scheme (MCS) at a time that is considered most efficient, based on channel status information fed back from the receiver.

Both the AMC and the channel sensitive scheduling schemes are based on the premise that the receiver feeds back its channel status information, referred to as a Channel Quality Indicator (CQI), to the transmitter.

Shifting from a multiple access scheme used for $2^{nd}$ Generation (2G) and 3G mobile communication systems, Code Division Multiple Access (CDMA) to Orthogonal Frequency Division Multiple Access (OFDMA) is an active study area in future-generation systems. The 3GPP and the 3GPP2 are working on standardizing evolved OFDMA systems. It is known that OFDMA increases capacity, compared to CDMA. One of many factors that bring the capacity increase is frequency-domain scheduling. As the channel sensitive scheduling offers a capacity gain based on the time-variant characteristics of channels, a higher capacity gain can be achieved by utilizing the property that channels have different characteristics in frequency. In order to support the frequency-domain scheduling, the transmitter should have knowledge of the channel status of each frequency. That is, the transmitter needs a CQI feedback for each frequency, thus increasing CQI feedback overhead.

MIMO is also under active study in the future-generation systems. MIMO is a technology for transmitting/receiving a plurality of data streams through multiple transmit/receive antennas using the same resources. It is said that for a receiver in a good channel status environment, more data is transmitted in a plurality of data streams with a lower modulation order than in a data stream with a high modulation order, under the same error probability. In MIMO, the dimension in which each data stream is transmitted is called a layer. Capacity is efficiently increased by separately applying AMC to individual layers according to their channel statuses. For example, Per Antenna Rate Control (PARC) transmits different data streams through different transmit antennas. Here, each layer corresponds to a transmit antenna. A plurality of transmit antennas experience different channels and PARC applies AMC such that more data can be transmitted through a transmit antenna in a good channel status and less data through a transmit antenna in a poor channel status. Another example of independent AMC application to different transmit antennas is Per Common Basis Rate Control (PCBRC). In PCBRC, each layer corresponds to a fixed transmission beam. PCBRC transmits more data by a transmission beam in a good channel status environment and less data by a transmission beam in a poor channel status environment.

In general, control information is transmitted and received on an F-SCCH in a mobile communication system. The F-SCCH is transmitted along with data to a Mobile Station (MS), carrying control information required for data demodulation. Fields of the F-SCCH will be described with reference to Table 1 below. Table 1 illustrates an exemplary format of an F-SCCH message. In addition to the fields listed in Table 1, other fields can be added or the number of bits of each field may vary.

TABLE 1

| Field | Block type | MACID | Persistent | ChanID | PF | Ext. Tx | Rank |
|---|---|---|---|---|---|---|---|
| Number of bits | 2 | 9-11 | 1 | 6-8 | 4-6 | 1 | 2 |
| FLAM | 00 | 1 | 1 | 1 | 1 | 1 | 0 |
| MCW FLAM1 | 01 | 1 | 1 | 1 | 1 | 1 | 0 |
| MCW FLAM2 | 10 | 1 | 0 | 0 | 3 | 1 | 0 |
| SCW FLAM | 11 | 1 | 1 | 1 | 1 | 1 | 1 |

In Table 1, Block type indicates the type of the F-SCCH message. Medium Access Control IDentifier (MACID) provides a MAC ID identifying an MS. Upon receipt of the F-SCCH message, the MS compares the received MAC ID with its MAC ID to determine whether data is intended for the MS. While the MAC ID is included in the F-SCCH message in Table 1, the F-SCCH message can be scrambled with a scrambling sequence specific to the MAC ID of the MS that will receive the F-SCCH message. Persistent is a field indicating whether resources allocated to the MS are fixed or variable.

ChanID (Channel IDentifier) identifies the resources allocated to the MS. PF (Packet Format) indicates a code rate and a modulation order such as Quadrature Phase Shift Keying (QPSK), 8PSK (8-ary PSK), or 16QAM (16-ary Quadrature Amplitude Modulation). Ext. Tx (Extended Transmission) indicates the time duration of transmission data. Rank is the number of data streams transmitted through a plurality of antennas.

FLAM (Forward Link Assignment Message) indicates that the F-SCCH message is for allocating downlink resources. MCW (Multi CodeWord) indicates that when a plurality of data streams are transmitted through a plurality of antennas, the data streams include codewords resulting from independent channel coding (e.g. turbo coding). SCW (Single CodeWord) indicates that when a plurality of data streams are transmitted through a plurality of antennas, each of the data streams includes part of a codeword resulting from a single channel coding. In Table 1, FLAM, MCW FLAM1, MCW FLAM2, and SCW FLAM are types of F-SCCH messages.

In Table 1, for each F-SCCH message type, bold numerals are logical values indicating whether the F-SCCH message includes the fields corresponding to the logical values. For example, for FLAM, Rank is 0 (not included), whereas for SCW FLAM, Rank is 1 (included). Because an F-SCCH message being FLAM is transmitted through a single transmit antenna in SIMO (Single Input Multiple Output), the F-SCCH message does not need Rank that is required for transmission of a plurality of data streams. On the contrary, for SCW FLAM, a plurality of data streams can be transmitted and thus Rank is needed.

However, the above conventional F-SCCH message format supports neither precoding that can be used for multiple transmit/receive antennas nor various formats of pilots. When common pilots are used, a precoding scheme used for data should be notified separately. If dedicated pilots are used, the pilot format of the dedicated pilots should be indicated. Accordingly, there exists a need for a technique for notifying a precoding scheme and the format of dedicated pilots by an F-SCCH message.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method and apparatus for supporting precoding and various pilot formats in a MIMO mobile communication system.

Another aspect of exemplary embodiments of the present invention is to provide a method and apparatus for efficiently using a control channel in a MIMO mobile communication system.

A further aspect of exemplary embodiments of the present invention is to provide a method and apparatus for indicating the format of a dedicated pilot signal and a precoding scheme by configuring a control message according to the pilot format and the precoding scheme in a MIMO mobile communication system.

In accordance with an aspect of exemplary embodiments of the present invention, there is provided an apparatus for transmitting a control channel message in a MIMO mobile communication system, in which a control channel message generator generates a pilot/MIMO field indicating at least one of a pilot format, a MIMO transmission rank being a number of transmission layers in which encoded packet streams are transmitted, and precoding information for a MIMO transmission of data, and outputs a control channel message including the pilot/MIMO field; and a transmission module converts the control channel message to a radio signal and transmits the radio signal to an MS. If common pilots are used for data demodulation in the MS and at least one of a knock-down precoding scheme and a ready-made precoding scheme is used for the MIMO transmission, the pilot/MIMO field includes information about the at least one precoding, and if dedicated pilots are used for data demodulation in the MS, the pilot/MIMO field indicates a pilot format of the dedicated pilots.

In accordance with another aspect of exemplary embodiments of the present invention, there is provided a method for transmitting a control channel message in a MIMO mobile communication system, in which a pilot/MIMO field is generated, which indicates at least one of a pilot format, a MIMO transmission rank being a number of transmission layers in which encoded packet streams are transmitted, and precoding information for a MIMO transmission of data, a control channel message including the pilot/MIMO field is output and converted to a radio signal, and the radio signal is transmitted to an MS. If common pilots are used for data demodulation in the MS and at least one of a knock-down precoding scheme and a ready-made precoding scheme is used for the MIMO transmission, the pilot/MIMO field includes the precoding information about the at least one precoding, and if dedicated pilots are used for data demodulation in the MS, the pilot/MIMO field indicates the pilot format of the dedicated pilots.

In accordance with a further aspect of exemplary embodiments of the present invention, there is provided an apparatus for receiving a control channel message in a MIMO mobile communication system, in which a reception module receives a control channel message on a control channel, and a control channel message interpreter extracts a pilot/MIMO field from the control channel message, the pilot/MIMO field indicating at least one of a pilot format, a MIMO transmission rank being a number of transmission layers in which encoded packet streams are transmitted, and precoding information for a MIMO transmission of data, and analyzes the pilot/MIMO field according to used pilots and a used precoding scheme. If common pilots are used for data demodulation in an MS and at least one of a knock-down precoding scheme and a ready-made precoding scheme is used for the MIMO transmission, the pilot/MIMO field includes precoding information about the at least one precoding, and if dedicated pilots are used for data demodulation in the MS, the pilot/MIMO field indicates a pilot format of the dedicated pilots.

In accordance with still another aspect of exemplary embodiments of the present invention, there is provided a method for receiving a control channel message in a MIMO mobile communication system, in which a control channel message is received on a control channel, a pilot/MIMO field is extracted from the control channel message, the pilot/MIMO field indicating at least one of a pilot format, a MIMO transmission rank being a number of transmission layers in which encoded packet streams are transmitted, and precoding information for a MIMO transmission of data, and the pilot/MIMO field is analyzed according to used pilots and a used precoding scheme. If common pilots are used for data demodulation in an MS and at least one of a knock-down precoding scheme and a ready-made precoding scheme is used for the MIMO transmission, the pilot/MIMO field includes precoding information about the at least one precoding, and if dedicated pilots are used for data demodulation in the MS, the pilot/MIMO field indicates a pilot format of the dedicated pilots.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
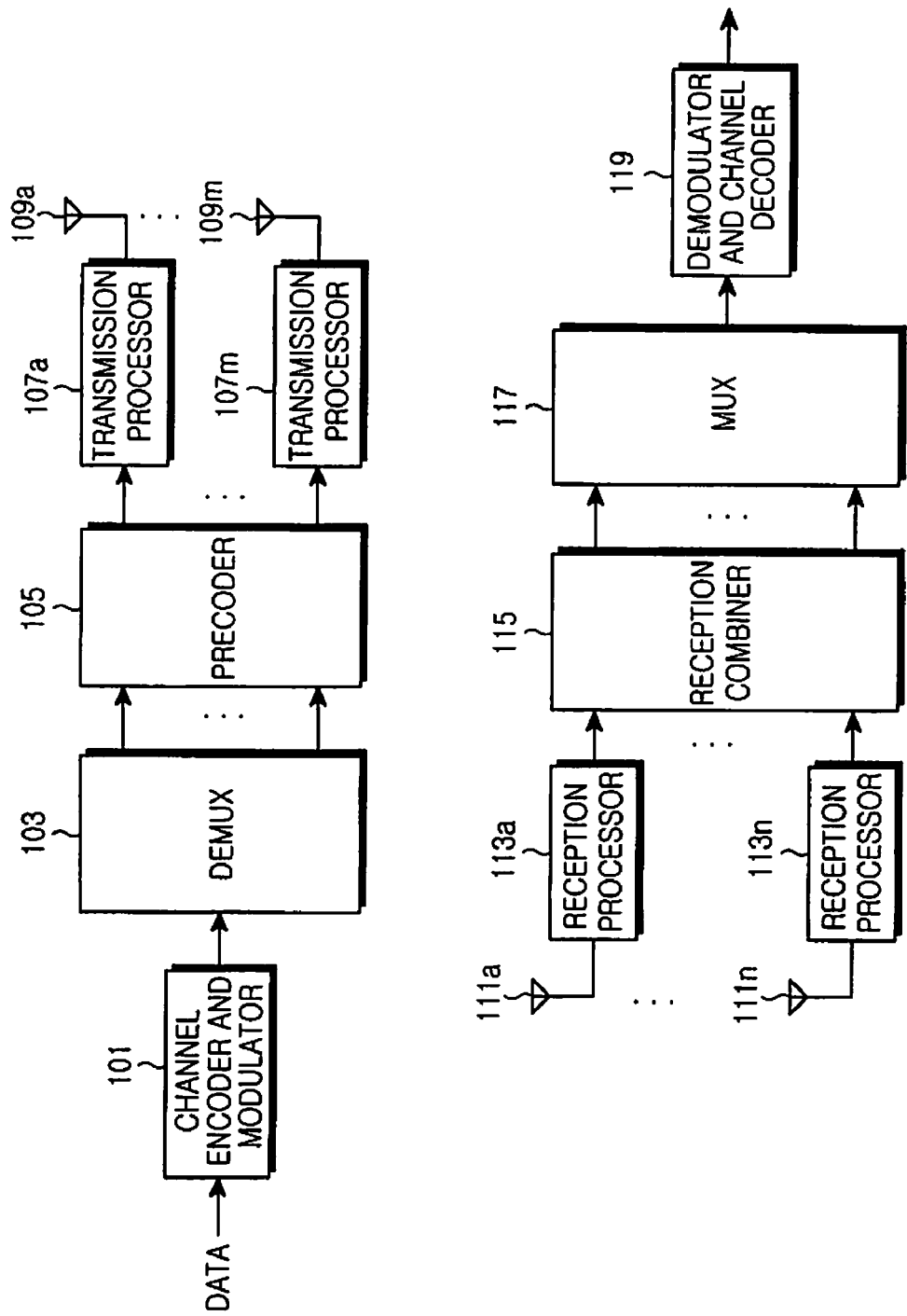
FIG. 1 is a block diagram of an SCW MIMO transmitter and an SCW MIMO receiver.

The matters defined in the description such as a detailed construction and elements are provided to assist in a comprehensive understanding of exemplary embodiments of the invention. Throughout the drawings, the same drawing reference numerals will be understood to refer to the same elements, features and structures. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and apparatus for indicating a precoding scheme and a pilot format of a dedicated pilot signal by a control channel message in a MIMO mobile communication system. For this purpose, a pilot/MIMO-associated field is added to an F-SCCH message to provide precoding information and information about the pilot format of a dedicated pilot signal.

In order to provide a better understanding of the present invention, a MIMO system will be described below.

When MIMO is implemented using multiple antennas, precoding is performed for adaptive beamforming based on channel status. Precoding refers to a process of preliminarily converting a transmission signal, prior to transmission, through a transmit antenna. If the precoding takes the form of linear combination, it is given as:

$$x=Es \quad (1)$$

where s denotes a K×1 vector of transmission data and x denotes an M×1 vector of actual transmission signals. K is the number of symbols transmitted simultaneously in the same resources in MIMO, M denotes the number of transmit antennas, and E denotes an M×K precoding matrix representing a precoding scheme. Equation (1) describes the precoding scheme E for simultaneously transmitting K data streams from a MIMO transmitter with M transmit antennas.

The precoding matrix E is determined adaptively according to MIMO transmission channels. Without knowledge of the MIMO channels, a transmitter performs the precoding based on feedback information received from a receiver. Hence, a precoding codebook with a predetermined number of precoding matrices E is preset between the transmitter and the receiver. The receiver selects the best precoding matrix E according to the current channel status from the precoding codebook and feeds back the selected precoding matrix E to the transmitter. The transmitter transmits signals by MIMO using the precoding matrix E.

The transmission signals x experience MIMO channels with channel characteristics H. Thus, the received signals at the receiver are:

$$y=Hx+z=HEs+z \quad (2)$$

where y and z denote an N×1 vector of signals received at N receive antennas and an N×1 vector of noise signals at the N receive antennas, respectively, and H denotes an N×M MIMO channel matrix. The received signals y are subject to reception combination to improve a Signal-to-Interference and Noise Ratio (SINR) of the transmitted data stream of each layer. The resulting signals r are expressed as Equation (3):

$$r=Wy+WHx+Wz=WHEs+Wz \quad (3)$$

where W denotes an N×N reception combination matrix and r denotes an N×1 vector of reception-combined signals. To receive the transmitted data stream of each layer more successfully, a reception technique can be additionally used, such as interference cancellation or Maximum Likelihood (ML) reception.

Depending on the number of encoded packets from which a plurality of MIMO signal streams are generated, SCW or MCW is selected. For instance, a selection is made between SCW MIMO and MCW MIMO for an MS according to the amount of data to be transmitted to the MS, the performance of the MS, or the channel status of the MS. The selection can also be made based on any other factor unspecified here. An antenna selection Space Time Transmit Diversity (STTD) scheme can be further used as a multi-antenna transmission scheme.

FIG. 1 is a block diagram of an SCW MIMO transmitter and an SCW MIMO receiver.

Referring to FIG. 1, a channel encoder and modulator 101 converts transmission data to an encoded packet stream. A DEMUX (DEMultipleXer) 103 demultiplexes the encoded packet stream into K data streams, for MIMO transmission. A precoder 105 precodes the K data streams to M signal streams to be transmitted in different transmission beams through M transmit antennas 109a to 109m. M transmission processors 107a to 107m process the M signal streams and transmit the processed M signal streams through the M transmit antennas 109a to 109m. The processing of the transmission processors 107a to 107m include filtering or Radio Frequency (RF) processing performed at the front ends of the transmit antennas 109a to 109m as well as an operation for producing CDMA or OFDMA signals.

The M signals from the transmit antennas 109a to 109m experience MIMO channels and are received at N receive antennas 111a to 111n. N reception processors 113a to 113n, which are the counterparts of the transmission processors 107a to 107m, downconvert the received signals to baseband signals. A reception combiner 115 performs the operation of the precoder 105 on the baseband signals in the reverse order, thus recovering K data streams. A MUX (Mutliplexer) 117 multiplexes the K data streams to a single packet stream. A demodulator and channel decoder 119 recovers the data transmitted by the SCW MIMO transmitter.

Due to the use of the single channel encoder and modulator 101, a single CQI is fed back in SCW MIMO. The number of MIMO data streams, i.e. the number of MIMO transmission layers, K is adjusted according to a channel status. K is called a rank. Therefore, SCW MIMO feedback information includes one CQI representing the channel statuses of the MIMO transmission layers, and the number of the transmission MIMO layers, i.e. the rank.

Figure 2:
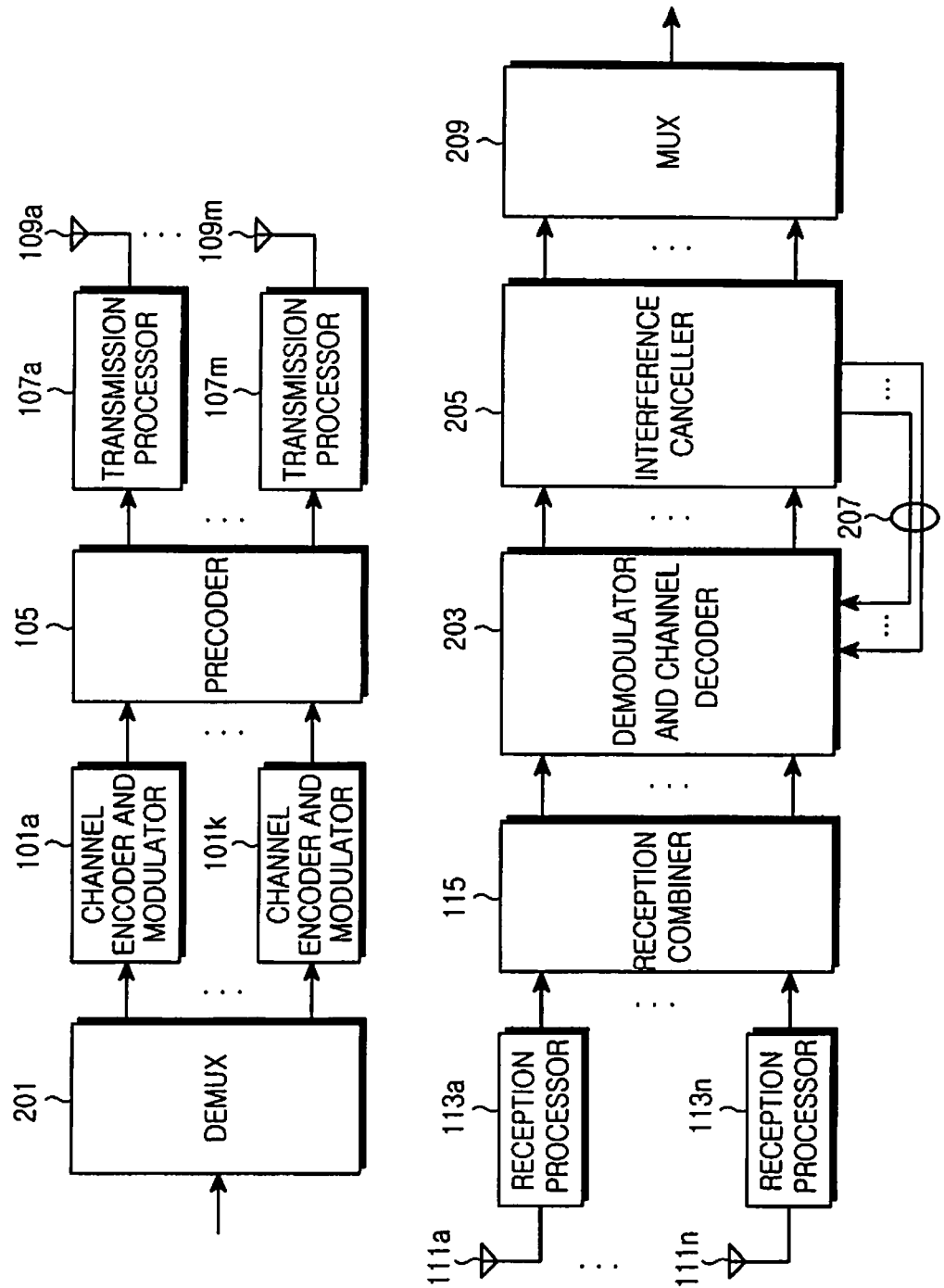
FIG. 2 is a block diagram of an MCW MIMO transmitter and an MCW MIMO receiver.

FIG. 2 is a block diagram of an MCW MIMO transmitter and an MCW MIMO receiver. In MCW MIMO, different encoded packet streams are transmitted in different MIMO layers.

Referring to FIG. 2, a DEMUX 201 demultiplexes transmission data into as many data streams as a rank. Channel encoders and modulators 101a to 101k convert the data streams to K packet streams for the respective MIMO layers. The precoder 105 and the transmission processors 107a to 107m corresponding to the transmit antennas 109a to 109m process the K packet streams to signal streams to be transmitted through the transmit antennas 109a to 109m.

Several MCW MIMO reception steps are identical to SCW MIMO reception steps. To be more specific, the M signals from the transmit antennas 109a to 109m experience MIMO channels and are received at the N receive antennas 111a to 111n. The N reception processors 113a to 113n downconvert the received signals to baseband signals. The reception combiner 115 recovers K packet streams from the baseband signals. A demodulator and channel decoder 203 and an interference canceller 205 recover K data streams by operating the channel encoders and modulators 101a to 101m in the reverse order.

In the illustrated case of FIG. 2, the MCW MIMO receiver uses the interference canceller 205. The signals received at the N receive antennas 111a to 111n are recovered to packet streams of the respective MIMO layers after processing in the reception processors 113a to 113n and the reception combiner 115. The packet streams include mutual interference. Since MCW MIMO perform different channel encodings and modulations for different MIMO layers, the MCW MIMO receiver eliminates interference for earlier recovered signal of a particular layer from the received signals at the interference canceller 205, thus canceling the interference that the particular the layer causes to the other layers, while the demodulator and channel decoder 203 is operating. The use of the interference canceller 205 improves the channel capacities of the MIMO layers and thus enables transmission of more data via MCW MIMO.

In the process of reception through interference cancellation, when a signal of a first layer is successfully recovered in the demodulator and channel decoder 203, the interference canceller 205 cancels interference from the received signals using the first-layer signal. The interference-cancelled signal is fed back to the demodulator and channel decoder 203. The above signal recovery and interference cancellation is repeated until signals of all layers are successfully recovered or no more layers, from which signals are to be recovered, are remaining. A MUX 209 multiplexes the recovered signals of the plurality of layers to desired data.

In MCW MIMO mode, since a plurality of packet streams are generated through the different channel encoders and modulators 101a to 101k, CQIs for the respective layers should be fed back, but without a rank. The rank is implicitly indicated by setting CQIs to a predetermined value requesting no data transmission. Therefore, MCW MIMO feedback information includes a plurality of CQIs representing the channel statuses of the MIMO transmission layers.

A precoding matrix is formed in a knock-down manner or in a ready-made manner. For example, a request of the MS, the performance of the MS, or the channel status of the MS determines whether to perform knock-down precoding or ready-made precoding for an MS. One of the knock-down precoding and the ready-made precoding is selected for any other reason unspecified herein.

According to the knock-down precoding scheme, one of a plurality of preset universal matrices is selected and a precoding matrix is formed by selecting a column vector from the selected universal matrix. Given universal matrices U1 and U2, if signals are transmitted in two MIMO layers by selecting first and third column vectors of universal matrix U1, a precoding matrix is represented as E=[U1(:,1), U1(:,3)]. Here, A(:,i) represents an $i^{th}$ column vector of matrix A.

For MCW MIMO mode, a universal matrix index is used to indicate a selected universal matrix in representing a knock-down precoding matrix. Whether a column vector is selected or not is indicated by the Packet Format (PF) of a layer corresponding to the column vector. The PF is a field configured to indicate a Modulation and Coding Scheme (MCS) when AMC is used. One of available values to the PF field is set to null to indicate no data transmission. Therefore, although the transmitter does not indicate a column vector selected for precoding, the receiver can distinguish an activated column vector from a deactivated column vector.

For SCW MIMO mode, representation of a knock-down precoding matrix requires a universal matrix index and a vector bitmap indicating a selected column vector. The vector bitmap includes as many bits as the number of the columns of a universal matrix. If an $n^{th}$ bit is set to 1 in the vector bitmap, this implies that an $n^{th}$ column vector has been selected. If the $n^{th}$ bit is set to 0 in the vector bitmap, this implies that the $n^{th}$ column vector has not been selected.

The purpose of a ready-made precoding scheme is to select one of a plurality of preset precoding matrices. The transmitter should be able to adjust a rank even with the ready-made precoding scheme. While the rank is controlled by selecting at least one column vector from a selected universal matrix in the knock-down precoding scheme, the rank is directly set in the ready-made precoding scheme. Once the rank is set, as many column vectors as the rank are selected from the selected precoding matrix, starting from the first column vector.

In order to represent a ready-made precoding matrix, the index of a selected precoding matrix is transmitted as feedback information in an MCW MIMO scheme, whereas the index and rank of the precoding matrix are transmitted as feedback information in SCW MIMO mode.

In an OFDMA system, the BS transmits a pilot signal for coherent detection of downlink data and measurement of downlink channel quality. Pilots used for data demodulation are classified into common pilots and dedicated pilots. For instance, common pilots or dedicated pilots are selected for an MS according to the configuration of resources allocated to the MS or the channel status of the MS.

The common pilots are common to a plurality of users (or MSs). They can serve the purposes of data demodulation and channel quality measurement. The common pilots are transmitted with a constant period across a total available frequency band irrespective of data transmission and resource allocation.

The dedicated pilots are dedicated to a particular user that receives data at a particular time in particular resources. For efficiency, the dedicated pilots are configured in the best pilot format according to the channel status of the user or according to a MIMO transmission rank. For instance, a pilot format designed to have more pilot tones along the frequency axis is more efficient for a user under a frequency selective fading environment experiencing a fluctuating change in channel response on the frequency axis. On the contrary, a pilot format designed to have more pilot tones along the time axis is more efficient for a user under a fast fading environment experiencing a fluctuating change in channel response on the time axis. Meanwhile, a pilot format allowing for insertion of orthogonal pilot tones that separate layers from one another is preferable for a user that has a low correlation between spatial channels and many receive antennas, and thus that pilot format will likely have a high rank. On the contrary, a pilot format that can reduce resources allocated to pilots is preferable for a user that will likely have a low rank, because there is no need to insert many orthogonal pilot tones. Hence, the transmitter prepares a plurality of pilot formats for the dedicated pilots and selects the best pilot format for a user according to the status of the user.

For demodulation of downlink data, OFDMA systems support only common pilots, only dedicated pilots, or both. While the present invention will be described in the context of an OFDMA system supporting both common pilots and dedicated pilots, it is to be clearly understood that the present invention is also applicable to an OFDMA system supporting only common pilots or only dedicated pilots.

In the case where the BS uses common pilots, even though the BS transmits data in one or more beams by precoding for a plurality of antennas, precoding targeting at a particular user is not applied to the common pilots because the common pilots are common to a plurality of users. Therefore, when common pilots are used and precoding applies to data transmission, a receiver, i.e. an MS performs channel estimation on the common pilots, taking into account the precoding applied to the data transmission and demodulates the data based on the channel estimation. To perform the channel estimation, the MS must be notified of the precoding applied to the data transmission.

In the case where the BS uses dedicated pilots, when the BS transmits data in one or more beams by precoding for a plurality of antennas, the same precoding generally applies to the dedicated pilots and the data, because the dedicated pilots are dedicated to a particular user. Hence, the receiver needs to know the precoding applied to the data for reception and demodulation of the data. Since the same precoding applies to the data and the dedicated pilots, the channel estimation result of the dedicated pilots reflects the influence of the precoding and thus the receiver can demodulate the data using the channel estimation result.

With reference to Table 2, fields of an F-SCCH message for MIMO transmission using a precoding scheme and dedicated pilots of a particular format according to the present invention will be described.

Table 2 illustrates the format of an F-SCCH message according to an exemplary embodiment of the present invention. Compared to Table 1, the F-SCCH message format further includes Pilot/MIMO. The bits of Pilot/MIMO are interpreted differently depending on whether common pilots or dedicated pilots are used, whether knock-down precoding or ready-made precoding applies, and whether an MCW MIMO mode or an SCW MIMO mode is used. The present invention is not limited to the following specific bit number of the Pilot/MIMO field. In practice, hence, the Pilot/MIMO field may have a different number of bits.

TABLE 2

| Field | Block type | MACID | Persistent | ChanID | PF | Ext. TX | Rank | Pilot/MIMO |
|---|---|---|---|---|---|---|---|---|
| Number of bits | 2 | 9-11 | 1 | 6-8 | 4-6 | 1 | 2 | 8 |

TABLE 2-continued

| Field | Block type | MACID | Persistent | ChanID | PF | Ext. TX | Rank | Pilot/MIMO |
|---|---|---|---|---|---|---|---|---|
| FLAM | 00 | 1 | 1 | 1 | 1 | 1 | 0 | 0 |
| MCW FLAM1 | 01 | 1 | 1 | 1 | 1 | 1 | 0 | 1 |
| MCW FLAM2 | 10 | 1 | 0 | 0 | 3 | 1 | 0 | 1 |
| SCW FLAM | 11 | 1 | 1 | 1 | 1 | 1 | 1 | 1 |

In the case of common pilots, Pilot/MIMO is interpreted as follows.

When common pilots are used, precoding applies to data only. To allow the receiver to estimate an equivalent channel reflecting precoding, the transmitter should notify the receiver of a precoding scheme used for data transmission. Thus, Pilot/MIMO provides precoding information indicating the precoding scheme.

If the precoding scheme is a knock-down scheme, the Pilot/MIMO field describes the knock-down precoding scheme. In MCW MIMO mode, one of eight bits in the Pilot/MIMO field indicates a universal matrix index and the other seven bits are set to a reserved value. In SCW MIMO mode, one of the eight Pilot/MIMO bits indicates a universal matrix index, four other bits form a vector bitmap, and the other three bits are set to a reserved value. If only one universal matrix exists, the one bit used to indicate a universal matrix index is also set to a reserved value. Antenna selection MIMO is a chief knock-down precoding scheme using only one universal matrix.

If the precoding scheme is a ready-made scheme, the Pilot/MIMO field describes the ready-made precoding scheme. In MCW MIMO mode, six of the eight Pilot/MIMO bits indicates a precoding matrix index and the other two bits are set to a reserved value. In SCW MIMO mode, six of the eight bits in the Pilot/MIMO field indicates a precoding matrix index and the other two bits are set to indicate a rank.

In the case of dedicated pilots, Pilot/MIMO is interpreted as follows.

When dedicated pilots are used, the same precoding scheme applies to data and the dedicated pilots, thus obviating the need for separate information describing the precoding scheme. Therefore, the Pilot/MIMO field describes the pilot format of the dedicated pilots, and when necessary, a rank. In MCW MIMO mode, two of the eight Pilot/MIMO bits are used to indicate the pilot format and the other six bits are set to a reserved value. In SCW MIMO mode, two of the eight Pilot/MIMO bits indicates the pilot format, two other bits indicates a rank, and the other four bits are set to a reserved value.

Figure 3:
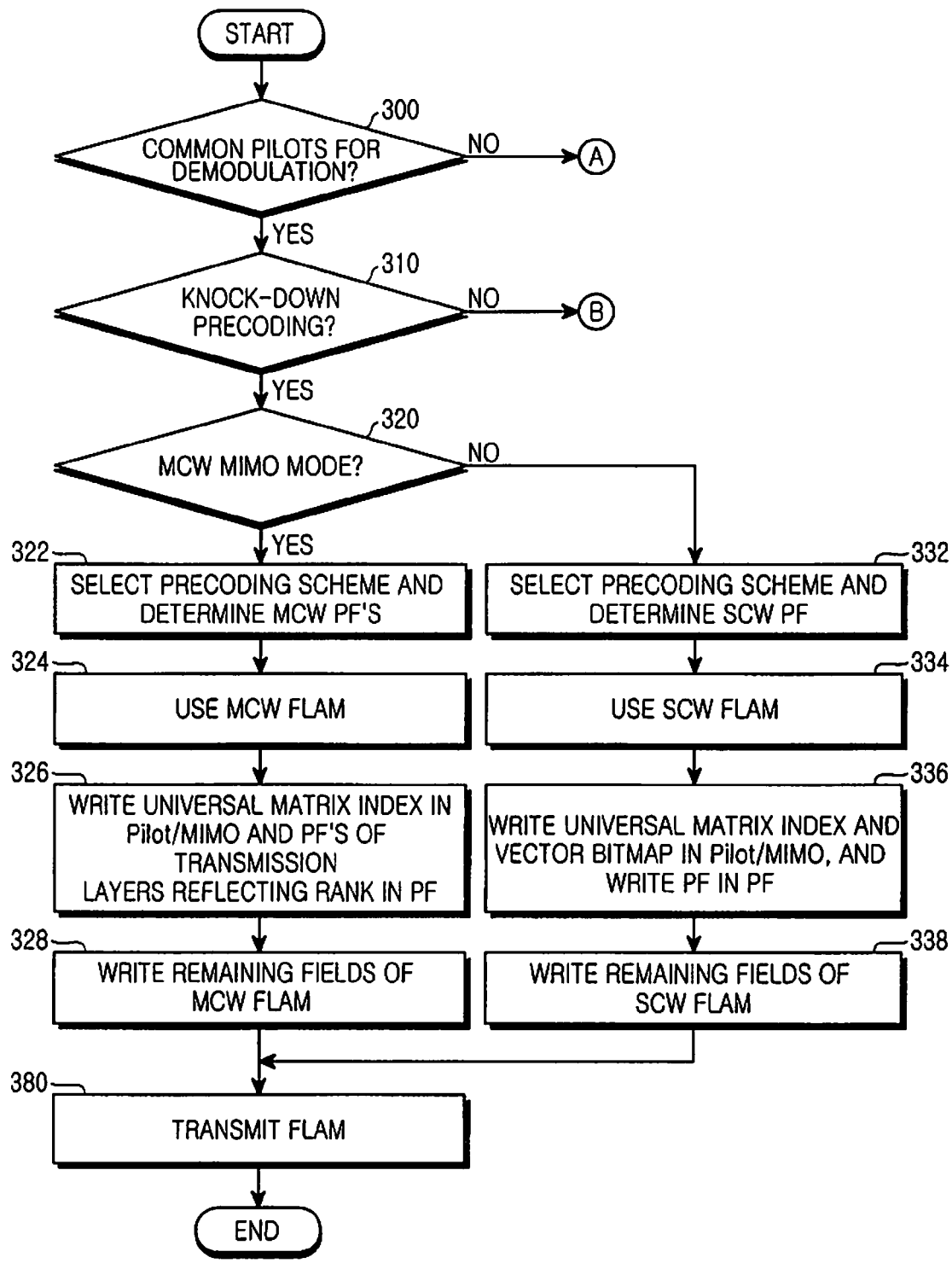
FIGS. 3, 4, and 5 are flowcharts of an operation for generating and transmitting an F-SCCH message in a BS.
Figure 4:
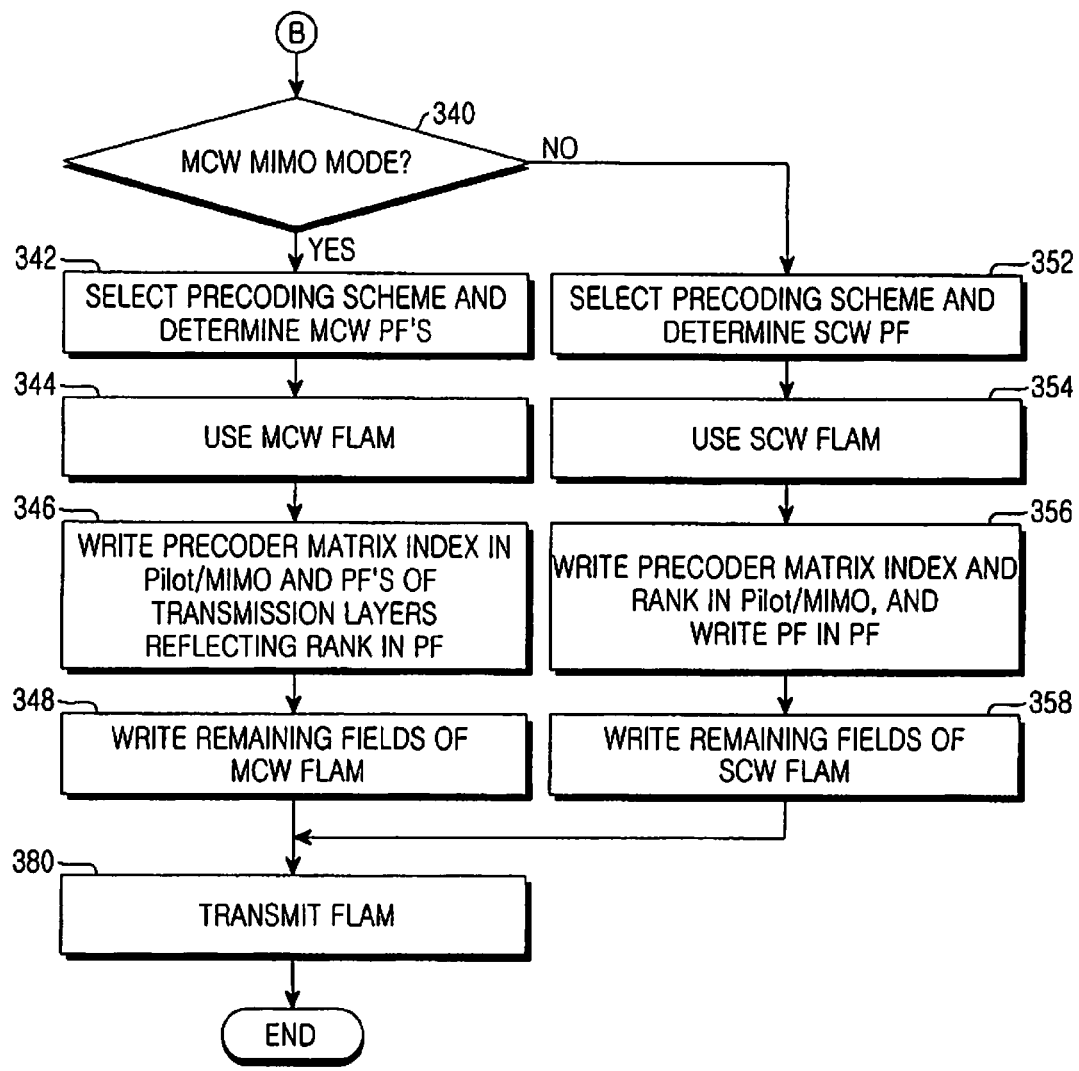
Figure 5:
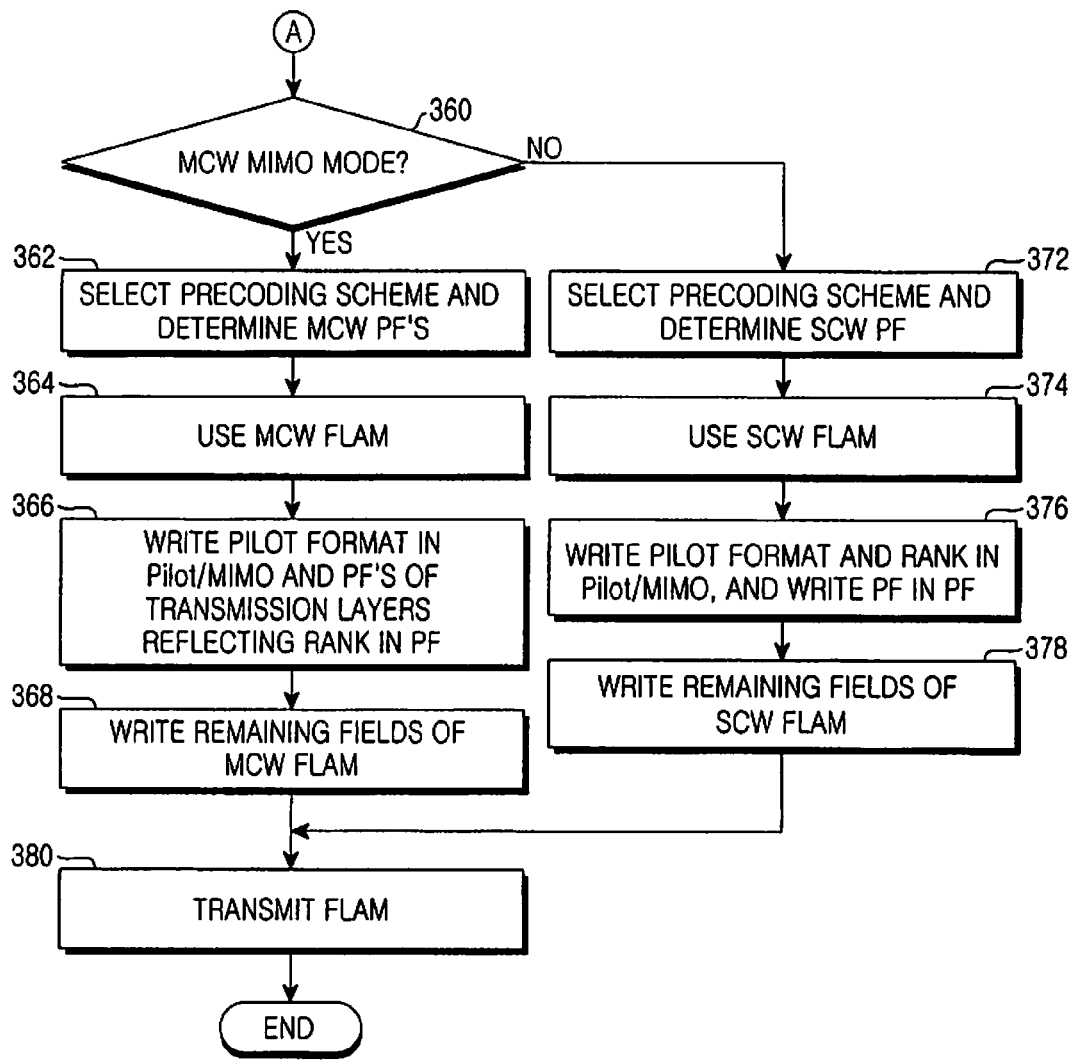

FIGS. 3, 4 and 5 are flowcharts of an operation for generating and transmitting an F-SCCH message in the BS.

Referring to FIG. 3, the BS determines whether common pilots or dedicated pilots are used for the MS, in step 300. If common pilots are used, the BS proceeds to step 310, and if dedicated pilots are used, the BS jumps to 'A' of FIG. 5.

In the case of common pilots, the BS determines whether to use knock-down precoding or ready-made precoding for the MS in step 310. If the BS uses ready-made precoding, the BS jumps to step 'B' of FIG. 4. If the BS uses knock-down precoding, it determines whether the MS is in MCW MIMO mode or SCW MIMO mode in step 320. In the case of an MCW MIMO mode with common pilots and knock-down precoding, the BS performs steps 322 to 328. However, in the case of an SCW MIMO mode with common pilots and knock-down precoding, the BS performs steps 332 to 338.

If the BS determines to use ready-made precoding in step 310, the BS determines whether the MS is in MCW MIMO mode or SCW MIMO mode in step 340 of FIG. 4. For an MCW MIMO mode with common pilots and ready-made precoding, the MS performs steps 342 to 348. For an SCW MIMO mode with common pilots and ready-made precoding, the MS performs steps 352 to 358.

In the MCW MIMO mode with common pilots and knock-down precoding, the BS selects a universal matrix index as precoding information for the MS and determines the PFs of the respective MIMO transmission layers for the MCW MIMO mode in step 322. In step 324, the BS determines to use MCW FLAM for the F-SCCH. For MCW FLAM, the BS writes the universal matrix index in Pilot/MIMO and writes the PFs of the MIMO transmission layers reflecting a rank in PF in step 326. After writing the other fields for MCW-FLAM in step 328, the BS proceeds to step 380.

In the SCW MIMO mode with common pilots and knock-down precoding, the BS selects a universal matrix index and a vector bitmap as precoding information for the MS and determines a PF for the SCW MIMO mode in step 332. The BS determines to use SCW FLAM for the F-SCCH in step 334. In step 336, for SCW FLAM, the BS writes the universal matrix index and the vector bitmap in Pilot/MIMO and writes the PF in PF in step 336. After writing the other fields for SCW FLAM in step 338, the BS proceeds to step 380.

In step 380, the BS transmits a FLAM message with the written fields to the MS on the F-SCCH.

In the MCW MIMO mode with common pilots and ready-made precoding, the BS selects a specific ready-made precoding scheme and determines PFs for the MCW MIMO mode in step 342. The BS determines to use MCW FLAM for the F-SCCH in step 344. In step 346, the BS writes a precoding matrix index in Pilot/MIMO for MCS-FLAM and writes the PFs of the respective MIMO transmission layers reflecting a rank for the MCW MIMO mode. After writing the other fields for MCW-FLAM in step 348, the BS proceeds to step 380.

In the SCW MIMO mode with common pilots and ready-made precoding, the BS selects a specific ready-made precoding scheme and determines a PF for the SCW MIMO mode in step 352. The BS determines to use SCW FLAM for the F-SCCH in step 354. In step 356, the BS writes a precoding matrix index and a rank in Pilot/MIMO for SCW-FLAM and writes the PF in PF. After writing the other fields for SCW-FLAM in step 358, the BS proceeds to step 380.

However, if the BS determines that dedicated pilots are used for the MS in step 300, the BS determines whether the MS is in MCW MIMO mode or SCW MIMO mode in step 360 of FIG. 5. In the case of an MCW MIMO mode with dedicated pilots, the BS selects precoding information for the MS according to knock-down precoding or ready-made precoding and determines the PFs of the respective MIMO transmission layers for the MCW MIMO mode in step 362. The BS determines to use MCW FLAM for the F-SCCH in step 364. In step 366, for MCW FLAM, the BS writes the pilot format of the dedicated pilots in Pilot/MIMO and the PFs reflecting a rank for the MCW-MIMO mode in PF. After writing the other fields for MCW FLAM in step 368, the BS goes to step 380.

In the case of an SCW MIMO mode with dedicated pilots, the BS selects precoding information for the MS according to knock-down precoding or ready-made precoding and determines a PF for the SCW MIMO mode in step 372. The BS determines to use SCW FLAM for the F-SCCH in step 374. In step 376, for SCW FLAM, the BS writes the pilot format of the dedicated pilots and a rank in Pilot/MIMO and the PF for SCW-MIMO in PF. After writing the other fields for SCW FLAM in step 378, the BS goes to step 380.

Figure 6:
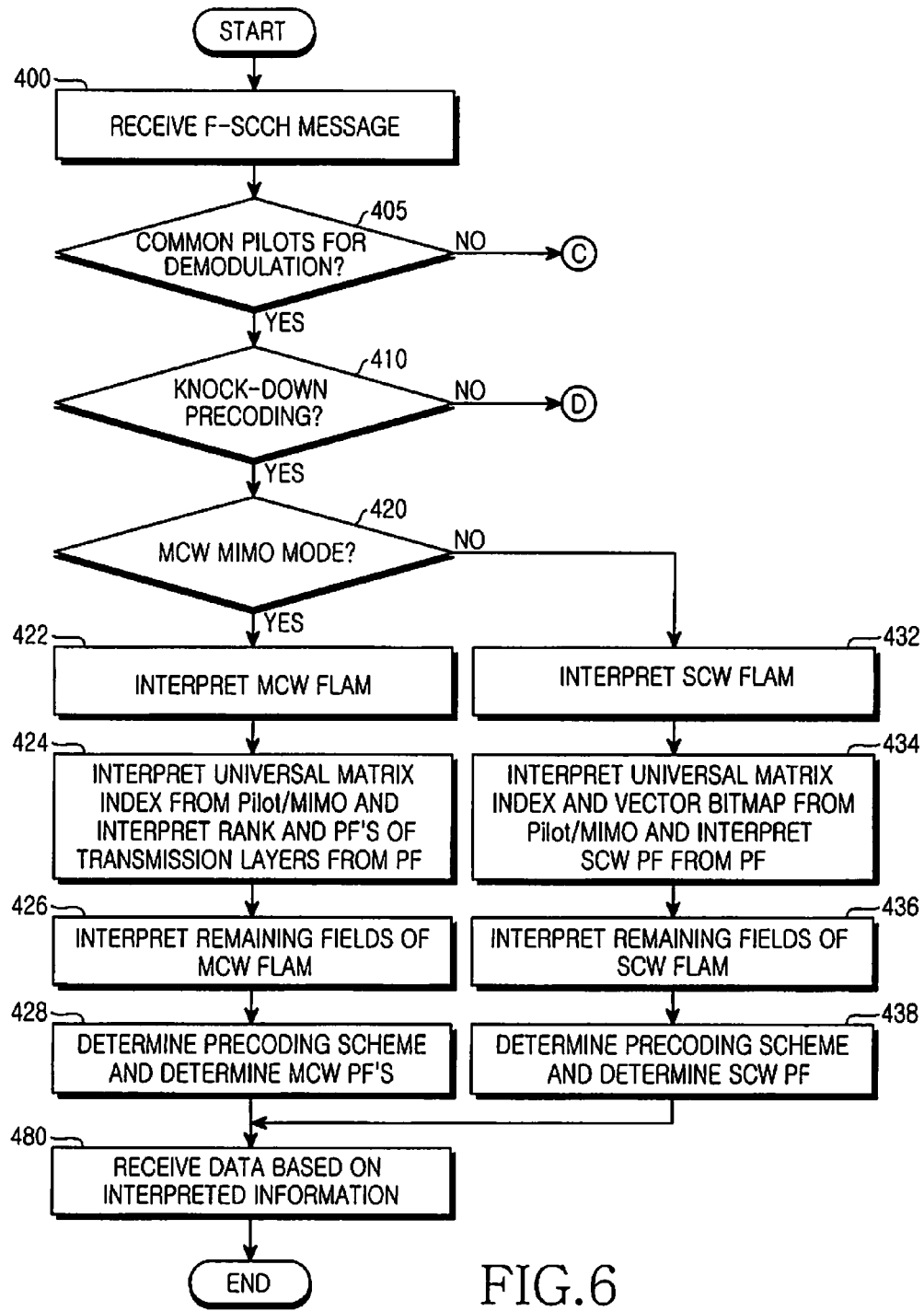
FIGS. 6, 7, and 8 are flowcharts of an operation for interpreting an F-SCCH message in an MS.
Figure 7:
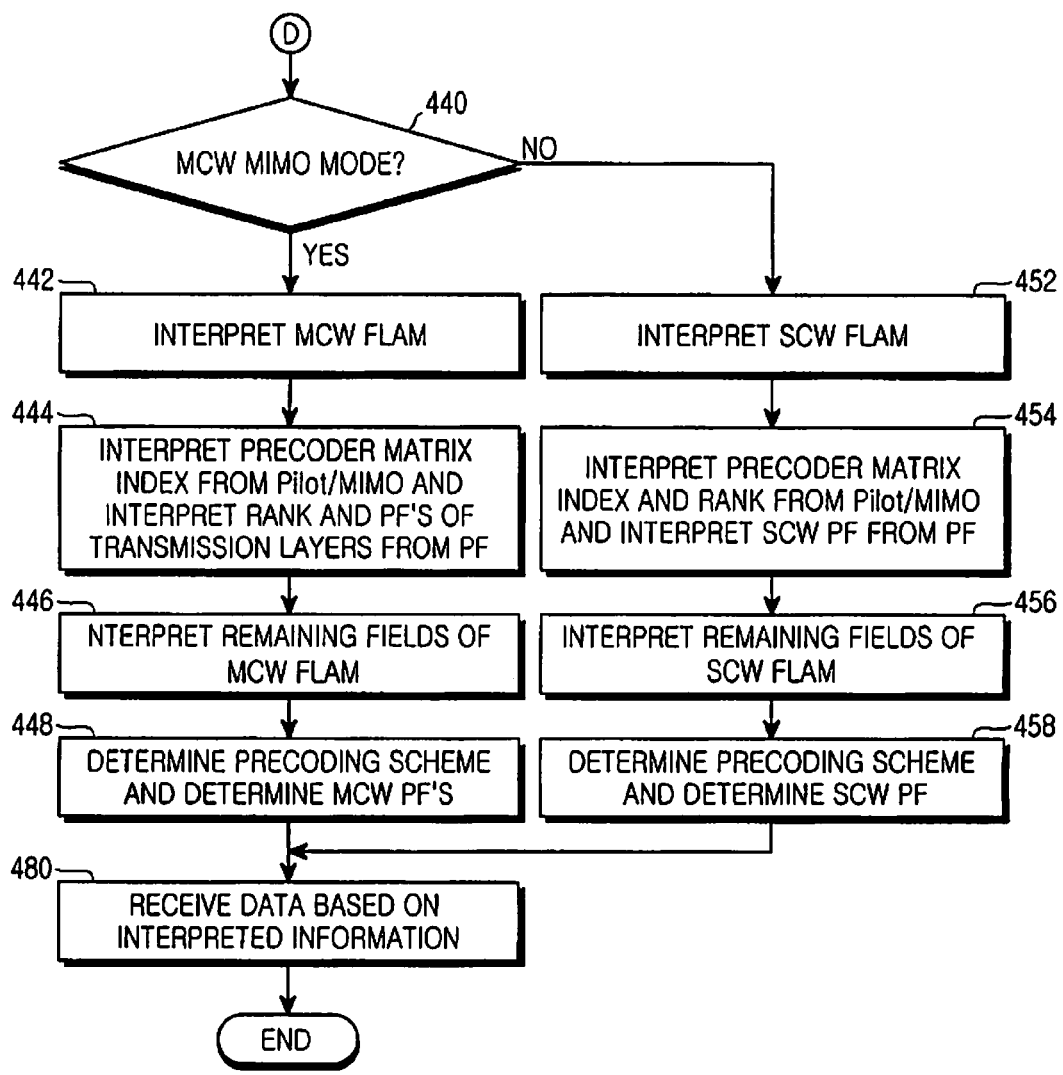
Figure 8:
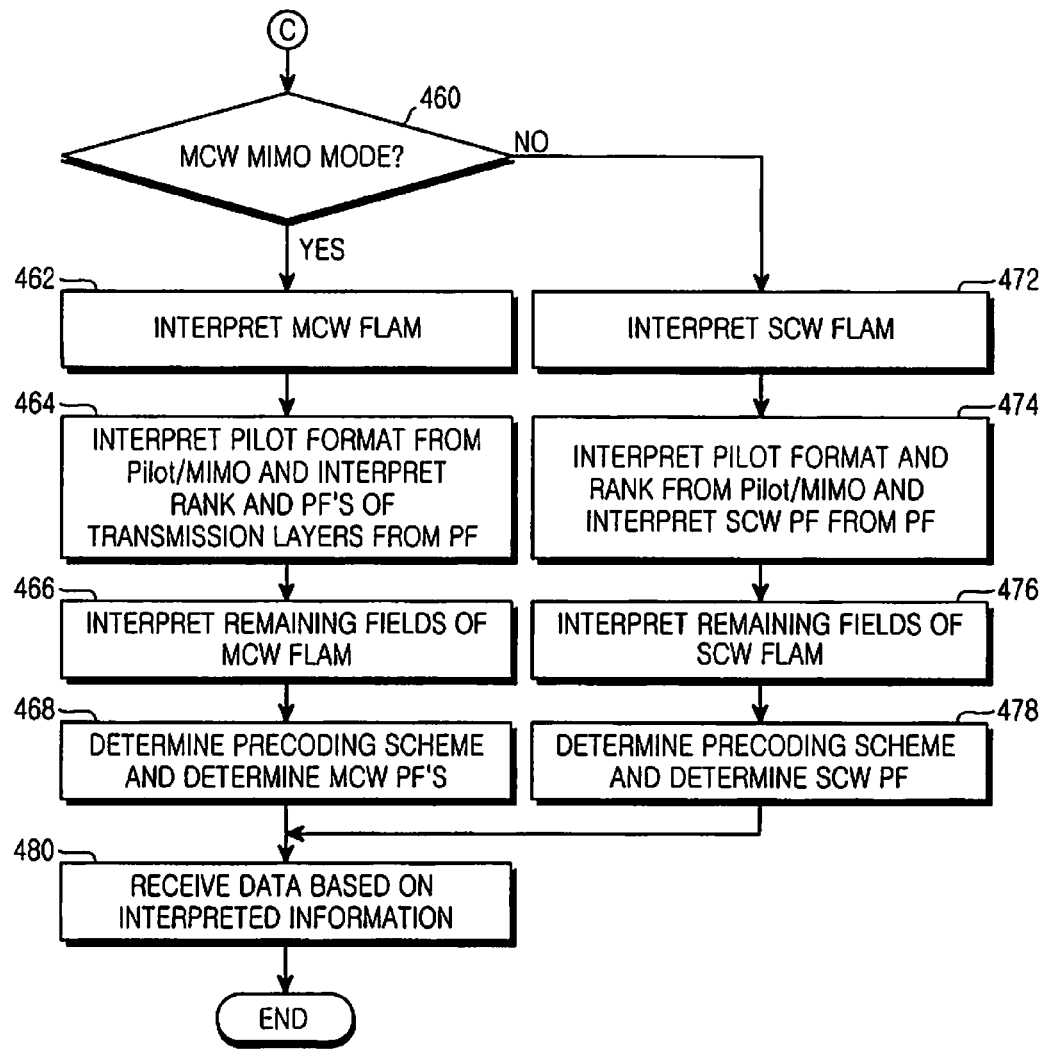

FIGS. 6, 7 and 8 are flowcharts of an operation for interpreting an F-SCCH message in the MS.

Referring to FIG. 6, the MS receives an F-SCCH message in step 400. To interpret the F-SCCH message, the MS first determines whether common pilots or dedicated pilots are used for the MS in step 405. If common pilots are used, the MS goes to step 410 and if dedicated pilots are used, the MS jumps to 'C' of FIG. 8.

When common pilots are used for the MS, the MS determines whether knock-down precoding or ready-made precoding is used in step 410. In the case of ready-made precoding, the MS proceeds to 'D' of FIG. 7. In the case of knock-down precoding, the MS determines whether the MS is in MCW MIMO mode or in SCW MIMO mode in step 420. In an MCW MIMO mode with common pilots and knock-down precoding, the MS performs steps 422 to 428. In an SCW MIMO mode with common pilots and knock-down precoding, the MS performs steps 432 to 438.

If the MS determines that ready-made precoding is used in step 410, the MS determines whether the MS is in MCW MIMO mode or in SCW MIMO mode in step 440 of FIG. 7. In an MCW MIMO mode with common pilots and ready-made precoding, the MS performs steps 442 to 448. In an SCW MIMO mode with common pilots and ready-made precoding, the MS performs steps 452 to 458.

In the MCW MIMO mode with common pilots and knock-down precoding, the MS considers the F-SCCH message to be an MCW FLAM message and interprets the fields of MCW FLAM in step 422. In step 424, the MS acquires a universal matrix index indicating a precoding matrix for the MCW MIMO mode from Pilot/MIMO of MCW FLAM and acquires a rank and the PFs of respective MIMO transmission layers from PF of MCW FLAM. After acquiring information from the other fields of MCW FLAM in step 426, the MS checks a precoding scheme (i.e. precoding matrix) applied to data and the PFs of the MIMO transmission layers for the MCW MIMO mode from the acquired information in step 428 and receives data based on the checked information in step 480. That is, the MS combines signals received at receive antennas using the precoding matrix and demodulates and decodes the combined signals using the PFs.

In the SCW MIMO mode with common pilots and knock-down precoding, the MS considers the F-SCCH message to be an SCW FLAM message and interprets the fields of SCW FLAM in step 432. In step 434, the MS acquires a universal matrix index and a vector bitmap that represent indicating a precoding matrix for the SCW MIMO mode from Pilot/MIMO of SCW FLAM and acquires a PF from PF of SCW FLAM. After acquiring information from the other fields of SCW FLAM in step 436, the MS checks a precoding scheme applied to data and the PF for the SCW MIMO mode from the acquired information in step 438 and goes to step 480.

In the MCW MIMO mode with common pilots and ready-made precoding, the MS considers the F-SCCH message to be an MCW FLAM message and interprets the fields of MCW FLAM in step 442. In step 444, the MS acquires a universal matrix index indicating a precoding matrix for the MCW MIMO mode from Pilot/MIMO of MCW FLAM and acquires a rank and the PFs of the respective MIMO transmission layers from PF of MCW FLAM. After acquiring information from the other fields of MCW FLAM in step 446, the MS checks a precoding scheme applied to data and the PFs of the MIMO transmission layers from the acquired information in step 448 and goes to step 480.

In the SCW MIMO mode with common pilots and ready-made precoding, the MS considers the F-SCCH message to be an SCW FLAM message and interprets the fields of SCW FLAM in step 452. In step 454, the MS acquires a universal matrix index and a vector bitmap that represent a precoding matrix for the SCW MIMO mode from Pilot/MIMO of SCW FLAM and acquires a PF from PF of SCW FLAM. After acquiring information from the other fields of SCW FLAM in step 456, the MS checks a precoding scheme applied to data and the PF for the SCW MIMO mode from the acquired information in step 458 and goes to step 480.

When dedicated pilots are used for the MS in step 400, the MS determines whether the MS is in MCW MIMO mode or in SCW MIMO mode in step 460 of FIG. 8.

In an MCW MIMO mode with dedicated pilots, the MS considers the F-SCCH message to be an MCW FLAM message and interprets the fields of MCW FLAM in step 462. In step 464, the MS acquires the pilot format of the dedicated pilots from Pilot/MIMO of MCW FLAM and acquires a rank and the PFs of the respective MIMO transmission layers from PF of MCW FLAM. After acquiring information from the other fields of MCW FLAM in step 466, the MS checks the pilot format and the PFs for the MCW MIMO mode from the acquired information in step 468 and goes to step 480. That is, the MS performs channel estimation using the pilot format, and demodulates and decodes data based on the channel estimation result.

In an SCW MIMO mode with dedicated pilots, the MS considers the F-SCCH message to be an SCW FLAM message and interprets the fields of SCW FLAM in step 472. In step 474, the MS acquires the pilot format of the dedicated pilots and a rank from Pilot/MIMO of SCW FLAM and a PF from PF of SCW FLAM. After acquiring information from the other fields of SCW FLAM, in step 476, the MS checks the pilot format, the PF, and the rank for the SCW MIMO mode from the acquired information in step 478 and goes to step 480.

How the 8-bit Pilot/MIMO field is interpreted has been described above. Up to eight bits are needed for the Pilot/MIMO field to indicate both a ready-made precoding scheme and a rank. Since ready-made precoding is more restricted in selecting a column vector than knock-down precoding, more precoding matrices should be secured for ready-made precoding. Hence, a large amount of information is taken for representing a precoding matrix index. The number of bits required for Pilot/MIMO can be reduced in the following exemplary embodiments of the present invention.

(1) Six bits are allocated to the Pilot/MIMO field. Aside from the case of common pilots and read-made precoding, the Pilot/MIMO field is used as illustrated in Table 2. It is noted that when common pilots and ready-made precoding are used, the Pilot/MIMO field provides only a precoding matrix index. In this case, the BS uses the latest rank that the MS has reported rather than it writes a rank in FLAM in the SCW MIMO mode, thereby saving two bits in rank notification. In this manner, the BS performs MIMO transmission only with a rank requested by the MS but it can change a ready-made precoding scheme irrespective of request of the MS.

(2) Five bits are allocated to the Pilot/MIMO field. Aside from the case of common pilots and ready-made precoding, the Pilot/MIMO field is used as illustrated in Table 2. It is noted that when common pilots and ready-made precoding are adopted, the Pilot/MIMO field provides only a rank. That is, the MS sets the total five bits of the Pilot/MIMO field to a reserved value without notifying a precoding matrix separately. For example, the MS can use the latest precoding matrix that it has reported to the BS for data transmission. In the SCW MIMO mode, the MS uses two bits of the Pilot/MIMO field to indicate a rank without notifying a precoding matrix separately and sets the other three bits of the Pilot/MIMO field to a reserved value. For example, the MS can use the latest precoding matrix that it has reported to the BS for data transmission in the SCW MIMO mode. In this manner, the BS performs MIMO transmission only with a precoding scheme requested by the MS but it can change a rank irrespective of request of the MS.

When the BS uses a precoding scheme and a rank that the MS has requested only if the Pilot/MIMO field is five bits long and common pilots and ready-made precoding are used for the MS as with the above second exemplary embodiment of the present invention, other exemplary embodiments can further be contemplated in which the five bits of Pilot/MIMO is set to a predetermined reserved value irrespective of MCW MIMO or SCW MIMO.

With the constraint that the BS uses only MIMO information reported by the MS without any change, the amount of information in the Pilot/MIMO field can be downsized. However, if the MS requests a specific MIMO operation but the BS fails to receive the request, this constraint is no longer imposed. In this case, the BS operates with transmit diversity or in Single Input Single Output (SISO) without MCW MIMO or SCW MIMO.

Figure 9:
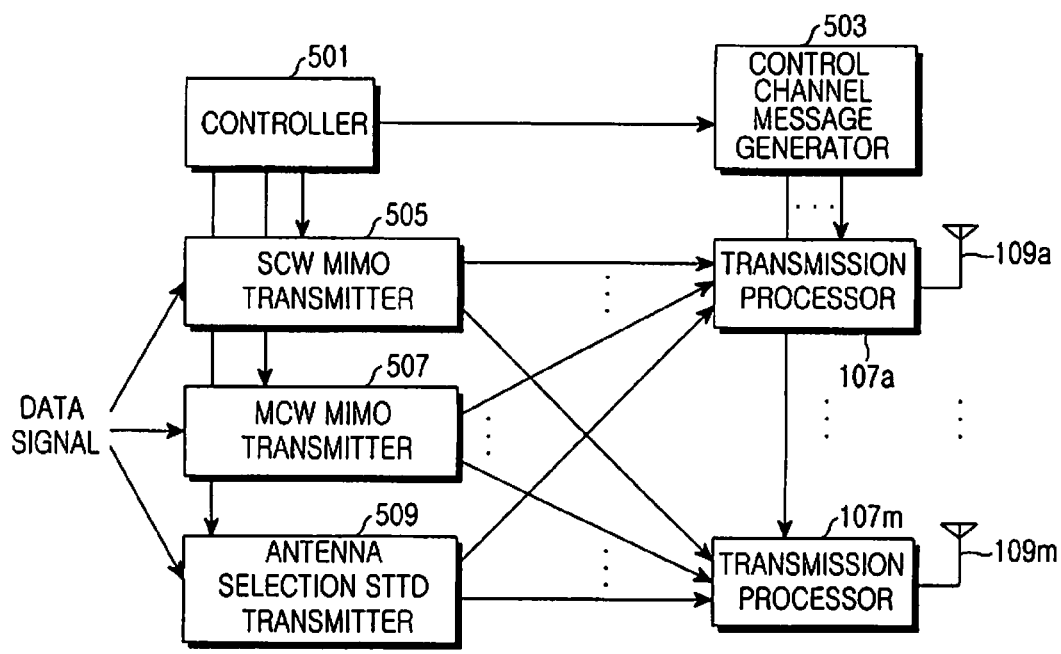
FIG. 9 is a block diagram of a transmitting apparatus according to an exemplary embodiment of the present invention.

FIG. 9 is a block diagram of a transmitting apparatus according to an exemplary embodiment of the present invention. The transmitting apparatus processes a data signal by a transmission scheme using multiple transmit antennas such as an SCW MIMO, an MCW MIMO, or an antennal selection STTD scheme. The other components 501, 505, 507, 509, and 107*a* to 107*m* except a control channel message generator 503 collectively form a transmission module.

Referring to FIG. 9, an SCW MIMO transmitter 505 is configured so as to process a data signal in SCW MIMO, an MCW MIMO transmitter 507 is configured so as to process a data signal in MCW MIMO mode, and an antenna selection STTD transmitter 509 is configured so as to process a data signal in antennal selection STTD mode. The transmitting apparatus includes at least one of the transmitters 505, 507, and 509.

A controller 501 determines a multi-antenna transmission scheme in which to process a data signal and notifies the control channel message generator 503 of the multi-antenna transmission scheme. The control channel message generator 503 generates a control channel message such that a receiver can detect the multi-antenna transmission scheme by interpreting the control channel message. The transmission processors 107*a* to 107*m* convert packet streams received from at least one of the transmitters 505, 507 and 509 and the control channel message to signal streams and transmit them through the M transmit antennas 109*a* to 109*m*.

Figure 10:
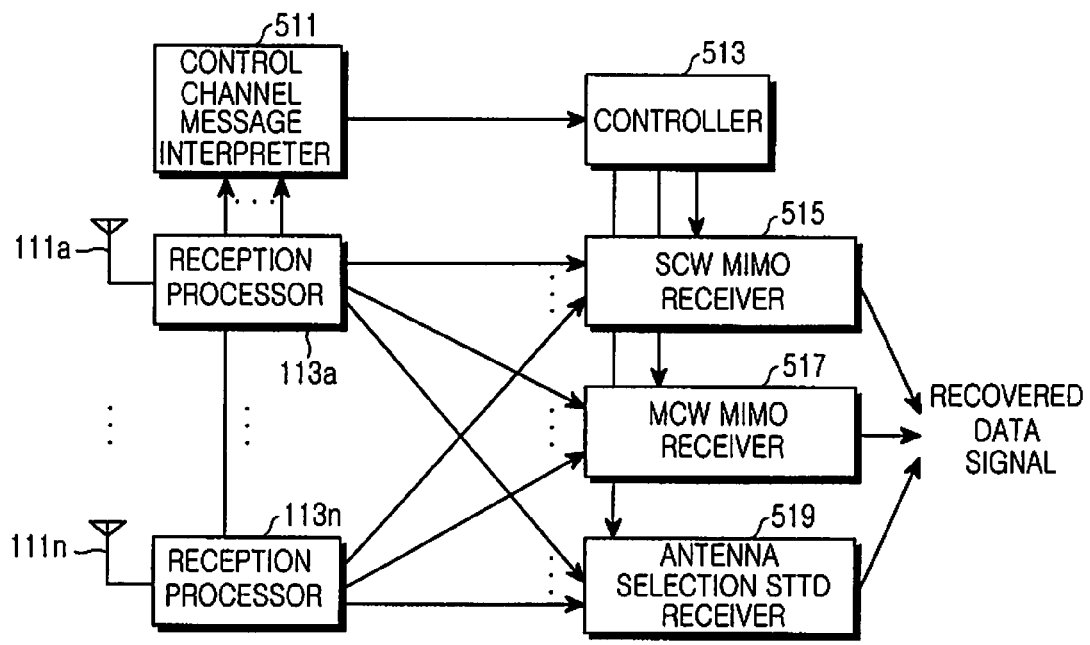
FIG. 10 is a block diagram of a receiving apparatus according to an exemplary embodiment of the present invention.

FIG. 10 is a block diagram of a receiving apparatus according to an exemplary embodiment of the present invention. The receiving apparatus processes a data signal in a reception scheme corresponding to a transmission scheme using multiple transmit antennas such as SCW MIMO, MCW MIMO, or antennal selection STTD. The other components 113, 515, 517, 519, and 513 except a control channel message interpreter 511 collectively form a reception module.

Referring to FIG. 10, signals received at the N receive antennas 111*a* to 111*n* are provided to at least one of an SCW MIMO receiver 515, an MCW MIMO receiver 517, and an antenna selection STTD receiver 519 through the reception processors 113*a* to 113*n*. The SCW MIMO receiver 515 is configured so as to process an SCW MIMO signal, the MCW MIMO receiver 517 is configured so as to process an MCW MIMO signal, and the antenna selection STTD transmitter 519 is configured so as to process an antenna selection STTD signal. The receiving apparatus includes at least one of the receivers 515, 517 and 519.

The control channel message interpreter 511 separates a control channel signal from the signals received through the reception processors 113*a* to 113*n*, determines the multi-antenna transmission scheme of the signals transmitted by the transmitting apparatus by interpreting a control channel message acquired from the control channel signal, and notifies a controller 513 of the multi-antenna transmission scheme. The controller 513 controls at least one of the receivers 515, 517 and 519 to receive data signals in a reception scheme corresponding to the multi-antenna transmission scheme. The receivers 515, 517 and 519 recover data signals by processing the signals received through the reception processors 113*a* to 113*n*.

The multi-antenna transmission schemes that the transmitting apparatus and the receiving apparatus support are notified during an initial access. Therefore, if the transmitting apparatus or the receiving apparatus is not equipped with a specific transmitter or a specific receiver, transmission is not performed in a multi-antenna transmission scheme that is implemented by the specific transmitter and receiver.

As is apparent from the above description, the present invention advantageously notifies a precoding scheme and the pilot format of pilots by an F-SCCH message. When common pilots are used, a used precoding scheme is indicated and when dedicated pilots are used, the format of the dedicated pilots is indicated. Therefore, capacity is improved and resources are efficiently managed.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for transmitting a control channel message in a Multiple Input Multiple Output (MIMO) mobile communication system, comprising:
    a control channel message generator for generating control information including at least one of a pilot format, a MIMO transmission rank being a number of transmission layers in which encoded packet streams are transmitted, and precoding information for a MIMO transmission, and outputting a control channel message including the control information; and
    a transmission module for converting the control channel message to a radio signal and transmitting the radio signal to a Mobile Station (MS),
    wherein if common pilots are used for data demodulation in the MS, the control information includes information about a precoding scheme and the MIMO transmission rank, and if dedicated pilots are used for data demodulation in the MS, the control information includes information about a pilot format of the dedicated pilots and the MIMO transmission rank.

2. The apparatus of, claim 1, wherein if the MS is in a Multi CodeWord (MCW) MIMO mode in which different encoded packets are transmitted in the transmission layers, and the common pilots are used for data demodulation, the control information includes 1-bit information indicating a precoding matrix.

3. The apparatus of claim 2, wherein if the MS is in the MCW MIMO mode, and the common pilots are used for data demodulation, the control information is set to a predetermined reserved value, without including information about the precoding scheme.

4. The apparatus of claim 1, wherein if the MS is in a Single CodeWord (SCW) MIMO mode in which one encoded packet is transmitted in the transmission layers, and the common pilots are used for data demodulation, the control information includes a 4-bit bitmap indicating at least one column of a precoding matrix.

5. The apparatus of claim 4, wherein if the MS is in the SCW MIMO mode, and the common pilots are used for data demodulation, the pilot control information includes two bits indicating the MIMO transmission rank.

6. The apparatus of claim 1, wherein if the MS is in an SCW MIMO mode in which one encoded packet is transmitted in the transmission layers and the dedicated pilots are used for data demodulation, the control information includes two bits indicating the pilot format of the dedicated pilots and two bits indicating the MIMO transmission rank.

7. A method for transmitting a control channel message in a Multiple Input Multiple Output (MIMO) mobile communication system, comprising:
    generating a control information including at least one of a pilot format, a MIMO transmission rank being a number of transmission layers in which encoded packet streams are transmitted, and precoding information for a MIMO transmission;
    outputting a control channel message including the control information; and
    converting the control channel message to a radio signal and transmitting the radio signal to a Mobile Station (MS),
    wherein if common pilots are used for data demodulation in the MS, the control information includes information about a precoding scheme and the MIMO transmission rank, and if dedicated pilots are used for data demodulation in the MS, the control information includes a pilot format of the dedicated pilots and the MIMO transmission rank.

8. The method of claim 7, wherein if the MS is in a Multi CodeWord (MCW) MIMO mode in which different encoded packets are transmitted in the transmission layers, and the common pilots are used for data demodulation, the control information includes 1-bit information indicating a precoding matrix.

9. The method of claim 8, wherein if the MS is in the MCW MIMO mode, and the common pilots are used for data demodulation, the control information is set to a predetermined reserved value, without including information about the precoding scheme.

10. The method of claim 9, wherein if the MS is in a Single CodeWord (SCW) MIMO mode in which one encoded packet is transmitted in the transmission layers, and the common pilots are used for data demodulation, the control information includes a 4-bit bitmap indicating at least one column of a precoding matrix.

11. The method of claim 10, wherein if the MS is in the SCW MIMO mode, and the common pilots are used for data demodulation, the control information includes two bits indicating the MIMO transmission rank.

12. The method of claim 7, wherein if the MS is in an SCW MIMO mode in which one encoded packet is transmitted in the transmission layers and the dedicated pilots are used for data demodulation, the control information includes two bits indicating the pilot format of the dedicated pilots and two bits indicating the MIMO transmission rank.

13. An apparatus for receiving a control channel message in a Multiple Input Multiple Output (MIMO) mobile communication system, comprising:
- a reception module for receiving a control channel message on a control channel; and
- a control channel message interpreter for extracting control information from the control channel message, the control information including at least one of a pilot format, a MIMO transmission rank being a number of transmission layers in which encoded packet streams are transmitted, and precoding information for a MIMO transmission, and analyzing the control information according to used pilots,
- wherein if common pilots are used for data demodulation in a Mobile Station (MS), the control information includes information about a precoding scheme and the MIMO transmission rank, and if dedicated pilots are used for data demodulation in the MS, the control information includes information about a pilot format of the dedicated pilots and the MIMO transmission rank.

14. The apparatus of claim 13, wherein if the MS is in a Multi CodeWord (MCW) MIMO mode in which different encoded packets are transmitted in the transmission layers, and the common pilots are used for data demodulation, the control information includes 1-bit information indicating a precoding matrix.

15. The apparatus of claim 14, wherein if the MS is in the MCW MIMO mode, and the common pilots are used for data demodulation, the control information is set to a predetermined reserved value, without including information about the precoding scheme.

16. The apparatus of claim 13, wherein if the MS is in a Single CodeWord (SCW) MIMO mode in which one encoded packet is transmitted in the transmission layers, and the common pilots are used for data demodulation, the control information includes a 4-bit bitmap indicating at least one column of a precoding matrix.

17. The apparatus of claim 16, wherein if the MS is in the SCW MIMO mode, and the common pilots are used for data demodulation, the control information includes two bits indicating the MIMO transmission rank.

18. The apparatus of claim 13, wherein if the MS is in an SCW MIMO mode in which one encoded packet is transmitted in the transmission layers and the dedicated pilots are used for data demodulation, the control information includes two bits indicating the pilot format of the dedicated pilots and two bits indicating the MIMO transmission rank.

19. A method for receiving a control channel message in a Multiple Input Multiple Output (MIMO) mobile communication system, comprising:
- receiving a control channel message on a control channel;
- extracting control information from the control channel message, the control information including at least one of a pilot format, a MIMO transmission rank being a number of transmission layers in which encoded packet streams are transmitted, and precoding information for a MIMO transmission; and
- analyzing the control information according to used pilots,
- wherein if common pilots are used for data demodulation in a Mobile Station (MS), the control information includes information about a precoding scheme and the MIMO transmission rank, and if dedicated pilots are used for data demodulation in the MS, the control information includes a pilot format of the dedicated pilots and the MIMO transmission rank.

20. The method of claim 19, wherein if the MS is in a Multi CodeWord (MCW) MIMO mode in which different encoded packets are transmitted in the transmission layers, and the common pilots are used for data demodulation, the control information includes 1-bit information indicating a precoding matrix.

21. The method of claim 20, wherein if the MS is in the MCW MIMO mode, and the common pilots are used for data demodulation, the control information is set to a predetermined reserved value, without including information about the precoding scheme.

22. The method of claim 19, wherein if the MS is in a Single CodeWord (SCW) MIMO mode in which one encoded packet is transmitted in the transmission layers, and the common pilots are used for data demodulation, the control information includes a 4-bit bitmap indicating at least one column of a precoding matrix.

23. The method of claim 22, wherein if the MS is in the SCW MIMO mode, and the common pilots are used for data demodulation, the control information includes two bits indicating the MIMO transmission rank.

24. The method of claim 19, wherein if the MS is in an SCW MIMO mode in which one encoded packet is transmitted in the transmission layers and the dedicated pilots are used for data demodulation, the control information includes two bits indicating the pilot format of the dedicated pilots and two bits indicating the MIMO transmission rank.

* * * * *